United States Patent [19]

Pask

[11] 4,305,696
[45] Dec. 15, 1981

[54] STATOR VANE ASSEMBLY FOR A GAS TURBINE ENGINE

[75] Inventor: George Pask, Stanton-by-Bridge, England

[73] Assignee: Rolls-Royce Limited, London, England

[21] Appl. No.: 116,652

[22] Filed: Jan. 29, 1980

[30] Foreign Application Priority Data

Mar. 14, 1979 [GB] United Kingdom ............... 9026/79

[51] Int. Cl.³ .................................... F01D 25/04
[52] U.S. Cl. ................................ 415/217; 415/191
[58] Field of Search ............ 415/135, 137, 216, 217, 415/218, 191

[56] References Cited

U.S. PATENT DOCUMENTS

| 2,252,817 | 8/1941 | Van Rijswijk | 415/135 |
|---|---|---|---|
| 2,997,275 | 8/1961 | Bean et al. | 415/217 |
| 3,708,242 | 1/1973 | Bruneau et al. | 415/217 |
| 3,778,184 | 12/1973 | Wood | 415/217 X |
| 3,932,056 | 1/1976 | Tai | 415/217 X |

FOREIGN PATENT DOCUMENTS 216737 6/1924 United Kingdom ............... 415/135

Primary Examiner—Leonard E. Smith
Attorney, Agent, or Firm—Cushman, Darby & Cushman

[57] ABSTRACT

A stator vane assembly for a gas turbine engine comprises a plurality of aerofoil sectioned vanes supported from a circumferentially extending support member or casing via a circumferentially extending platform or platforms. Each vane is attached at one end to one said platform which is carried from the supporting member, each platform being relatively flexible so that deflections of its respective aerofoil sectioned vane cause it to deform. The mounting between the platform and the supporting member is such as to damp motion of the platform and thus of the aerofoil sectioned vane; in some instances resilient material may be interposed between the platform and supporting member to provide the damping.

7 Claims, 6 Drawing Figures

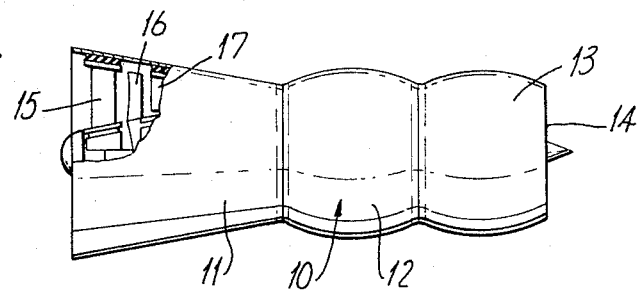
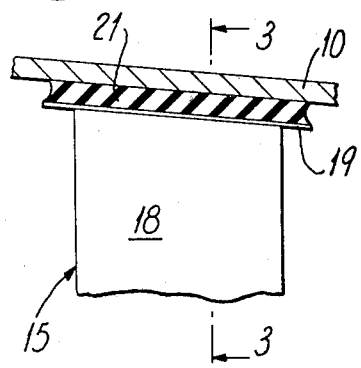
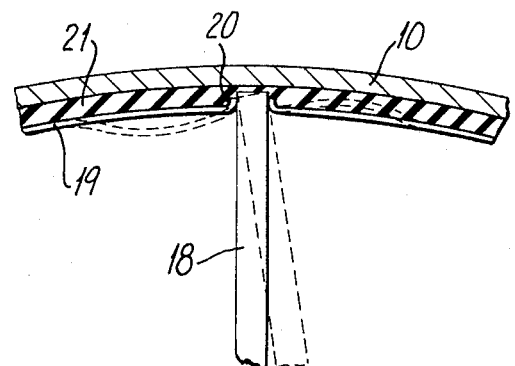
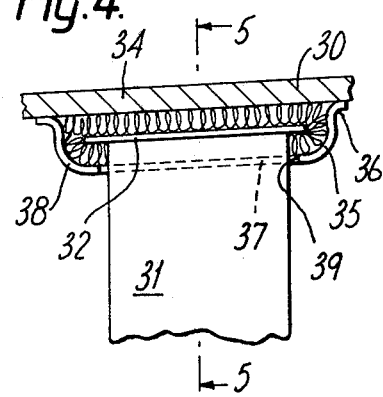
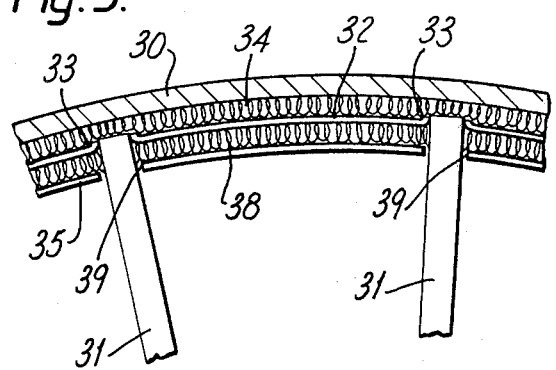
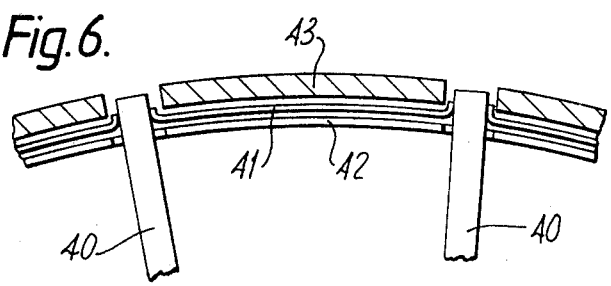

STATOR VANE ASSEMBLY FOR A GAS TURBINE ENGINE

This invention relates to a stator vane assembly for a gas turbine engine.

It has always been difficult in the design of gas turbine engines to provide a simple means of supporting the various stator vanes which will provide effective damping for the vanes while not introducing the danger of fretting against critical components such as expensive casings.

Thus in the past it has been proposed to introduce a layer of resilient damping material such as metal springs, or rubber or another elastomer between the aerofoil and the aperture in the supporting casing with which it engages, or between a conventional rigid shroud and its supporting casing. However, these prior art designs have been unsuccessful because they have either not provided sufficient support for the vanes or not been able to absorb sufficient energy to damp the vibration.

The present invention provides a construction which enables a large area of supporting material to be brought into play as a damping medium and as a support for the vane.

According to the present invention a stator vane assembly for a gas turbine engine comprises a plurality of aerofoil sectioned vanes supported from a circumferentially extending supporting member, characterised in that each said aerofoil sectioned vane is attached at one end to a circumferentially extending platform member carried from said supporting member, each platform member being relatively flexible so that deflections of its respective aerofoil cause it to deform, the platform member being mounted from the supporting member in such a manner as to damp its deformation and hence the deflection of the aerofoil sectioned vane.

In one embodiment the platform member is mounted from the supporting member via a layer of resilient material which spaces it from the casing member and which is compressed or expanded by deformation of the platform member so as to damp its movement.

Said supporting member may comprise an outer casing of the engine or it may comprise an inner supporting ring. It may of course be possible to use this arrangement both at the inner and outer extremities of the stators.

There may be provided a single platform member for each aerofoil or alternatively a single platform may be used for a plurality of vanes.

The resilient member may comprise an elastomer or alternatively may comprise a knitted wire material.

The invention will now be particularly described merely by way of example with reference to the accompanying drawings in which:

FIG. 1 is a partly broken away side view of a gas turbine engine having a stator vane assembly in accordance with the invention, FIG. 2 is an enlarged section of part of the stator vane assembly of FIG. 1, FIG. 3 is a section on the line 3—3 of FIG. 2, FIG. 4 is a view similar to FIG. 1 but of a second embodiment, FIG. 5 is a section on the line 5—5 of FIG. 4, and FIG. 6 is a view similar to FIG. 5 but of a further embodiment.

In FIG. 1 there is shown a gas turbine engine comprising a casing 10 within which are supported a compressor 11, a combustion chamber 12 and a turbine 13. The casing 10 forms at its downstream end a propulsion nozzle 14. Operation of the engine overall is conventional. It should be noted that although illustrated as a simple one-shaft gas turbine engine, this may be representative of the core of a fan engine or even one spool of a multi-shaft engine or core.

The casing 10 is cut away in the region of the compressor 11 so as to expose to view the inlet guide vanes 15 and the compressor rotor blades 16 and stator vanes 17.

FIG. 2 is an enlarged section through the outer portions of the inlet guide vanes 15 and the adjacent casing 10. It will be seen that each of the vanes 15 comprises an aerofoil section 18 which protrudes through a thin circumferentially extending platform member 19. Where the vane 15 passes through the platform 19 a plunged hole 20 is formed which is of similar section to that of the vane 15. The vane 15 is brazed to the platform at the plunged parts of the aperture 20.

The platform 19 is spaced by a short distance from the casing 10 which acts, in this region, as a circumferentially extending supporting member and in the space between the platform 19 and the casing 10 a layer 21 of an elastomeric material of high hysteresis is carried. The elastomer 21 which may for instance be a polyurethane or a synthetic rubber is strongly adherent to the supporting member or casing 10 and to the outer surface of the platform 19 in position. It will be appreciated that in normal circumstances each of the vanes 15 will also be supported in some manner at its inner extremity. It will therefore only be necessary for the elastomer 21 to support the aerofoils to a certain degree.

It will be noted that the platform 19 is made relatively thin. Therefore if the aerofoil sectioned vane 15 is angularly deflected either by loads on it or by the effect of a vane vibrating it will bend the platform 19.

In FIG. 3 a dotted line indicates in an exaggerated manner how the platform 19 will deform and it will be seen that by deforming in this way it attempts to expand a considerable volume of the elastomer 21 on the left hand side of the vane 15 and to compress an equal volume on the right hand side of the vane. This will of course be resisted by elastomer and the energy of the deformation will be quickly absorbed by the elastomer. Therefore this mounting provides a considerable degree of damping to the vanes.

It will be understood that the elastomer 21 could easily be replaced by a different resilient material. FIGS. 4 and 5 illustrate the use of a compressed wire mesh material known as Vibro-shock. In this case a casing 30 which is cylindrical supports a number of aerofoil sectioned vanes 31. Each vane 31 is mounted in a circumferentially extending platform member 32 by way of a plunged hole 33 in which it is brazed in a similar manner to that described in relation to FIGS. 2 and 3. The vanes 31 may have individual platform members 32 or the platform may support more than one vane.

Once again the platform members 32 are spaced from the casing 30 and a layer 34 of resilient material is interposed between these two members. However, in this case there is an additional refinement in that a top hat section ring member 35 is provided which is attached to the casing 30 by its external flanges 36. The casing 30 and ring member 35 in this case together form the circumferentially extending support member. The inset section 37 of the ring 35 is arranged to be spaced from the inner surface of the platform 32 by a space similar to that between the platforms 32 and the casing 30, and in this case a further layer of compressed wire material 38 is provided. The portion 37 is provided with apertures 39 which are clearance holes for the vanes 31 so that the portion 37 does not directly bear on the aerofoils.

Operation of this embodiment is very similar to that of the preceding embodiment. However, in this instance when the aerofoil is displaced the corresponding deflection of the platforms 32 compresses two layers of the resilient material. This may be preferable when using resilient materials such as the compressed wire mesh which are more able to absorb energy in compression than in expansion. By providing two layers of the material, compression is caused to take place on both sides of the displaced vane and the assembly is well supported.

In FIG. 6 a further embodiment is shown having a basic similarity to that of FIG. 5. Here the aerofoil sectioned vanes 40 are again supported from a thin, flexible platform member 41 which is trapped between a 'top hat' section ring 42 and a circumferentially extending supporting member or casing 43. However, unlike FIG. 5, no elastomeric material is used and the platform member 41 is simply damped by its engagement with the ring 42 and the casing 43.

It will be appreciated that a number of modifications could be made to the embodiments described above. Clearly it will be possible to use the same kind of mounting between the inner extremities of aerofoil sectioned vanes and the mounting ring and it will also be possible to use a variety of different elastomeric material or other resilient materials similar to the wire mesh referred to. Again although referred to in connection with the inlet guide vanes of the gas turbine engine the construction could be used for other compressor stator vanes and might in some circumstances be considered for use in the cooler parts of the turbine.

I claim:

1. A stator vane assembly for a gas turbine engine comprising:

a rigid supporting member having a circumferentially extending surface thereon;

at least one circumferentially extending flexible platform member capable of deformation and operatively carried from said supporting member, said flexible platform member having a circumferentially extending surface thereon corresponding to and spaced from the circumferentially extending surface of said supporting member;

means resiliently mounting said platform member from said supporting member; and at least one aerofoil sectioned vane rigidly attached at one end thereof to said flexible platform member, deflections of said aerofoil sectioned vane being transferred directly to said platform member to deform the same radially and such radial deformations being damped by said means resiliently mounting the platform member from said supporting member whereby deflections of said aerofoil sectioned blade are effectively damped.

2. A stator vane assembly as claimed in claim 1 and in which said plurality of said aerofoil sectioned vanes are associated with a single said platform member.

3. A stator vane assembly as claimed in claim 1 and in which said means resiliently mounting said platform member to said supporting member is a layer of resilient material through which each said platform member is mounted from said supporting member.

4. A stator vane assembly as claimed in claim 1 and in which said supporting member comprises a casing and a top hat section ring which cooperate to define an annular space in which said platform members are trapped, said aerofoil sectioned vanes protruding through the ring.

5. A stator vane assembly as claimed in claim 4 and in which there are two layers of resilient material in said space, between which said at least one flexible platform member is held.

6. A stator vane assembly as claimed in any of claims 3 or 5 in which said resilient material comprises a compressed wire mesh material.

7. A stator vane assembly as claimed in any of claims 2 or 5 in which said resilient material is an elastomer having a high hysteresis.

* * * * *